United States Patent [19]

Miericke et al.

[11] 3,951,075
[45] Apr. 20, 1976

[54] ELECTRO DYNAMIC SUSPENSION AND GUIDANCE SYSTEM FOR A MOVING VEHICLE

[75] Inventors: Jürgen Miericke, Nurnberg; Hans Hieronymus, Erlangen; Franz Pawlitschek, Neunhof; Laxmikant Urankar, Erlangen, all of Germany

[73] Assignee: Siemens Aktiengesellschaft, Munich, Germany

[22] Filed: Dec. 9, 1974

[21] Appl. No.: 530,967

[30] Foreign Application Priority Data
Jan. 14, 1974   Germany............................ 2401625

[52] U.S. Cl..................... 104/148 SS; 104/148 MS
[51] Int. Cl.²....................................... B61B 13/08
[58] Field of Search............... 104/148 SS, 148 LM, 104/148 MS

[56] References Cited
UNITED STATES PATENTS

| | | |
|---|---|---|
| 3,780,667 | 12/1973 | Miericke........................ 104/148 SS |
| 3,820,471 | 6/1974 | Maki............................. 104/148 SS |
| 3,834,317 | 9/1974 | Miericke........................ 104/148 SS |

Primary Examiner—Trygve M. Blix
Assistant Examiner—Reinhard J. Eisenzopf
Attorney, Agent, or Firm—Kenyon & Kenyon Reilly Carr & Chapin

[57] ABSTRACT

Contactless suspension and guidance of a vehicle using a plurality of primary magnet loops in the vehicle arranged parallel to each other which react with secondary conductors on the roadbed is obtained by providing two vertically arranged primary conductor loops on the vehicle which cooperate with a stabilizing secondary conductor loop disposed between them to form a zero flux system for lateral guidance with a secondary conductor for suspension arranged perpendicular to the vertical conductor loops and below the stabilizing secondary conductor loop to form a normal flux system for suspension, whereby because of the mutual spatial relationship of the two primary conductor loops separate loops for the normal flux system are not required.

9 Claims, 5 Drawing Figures

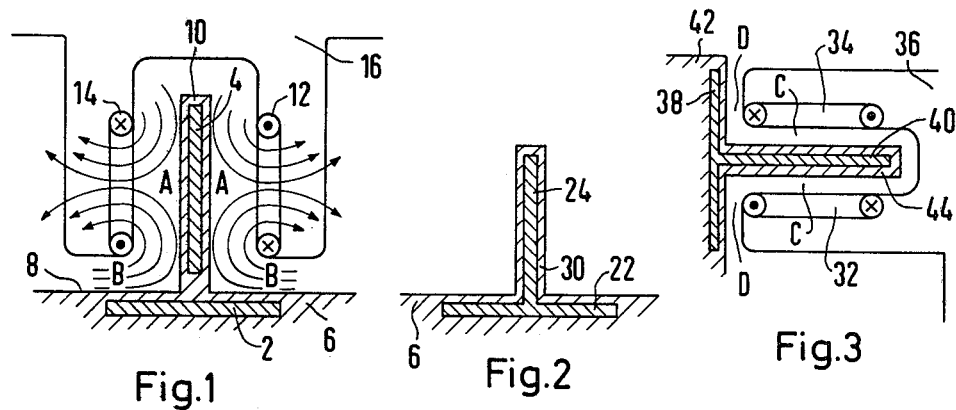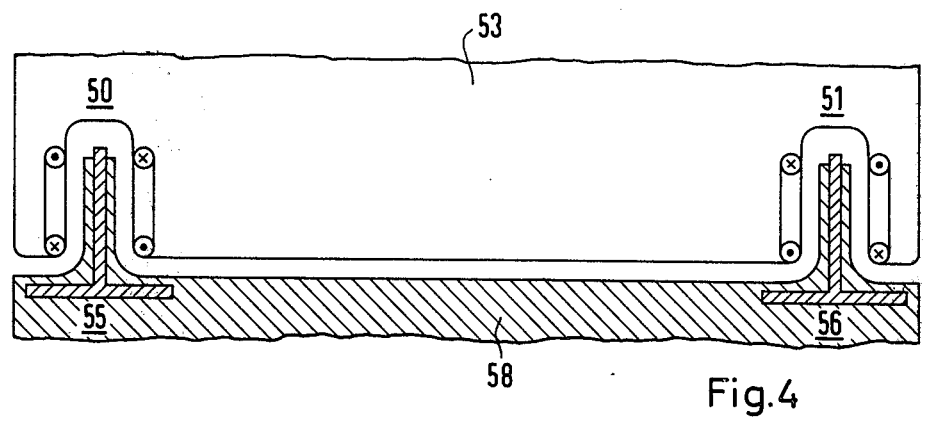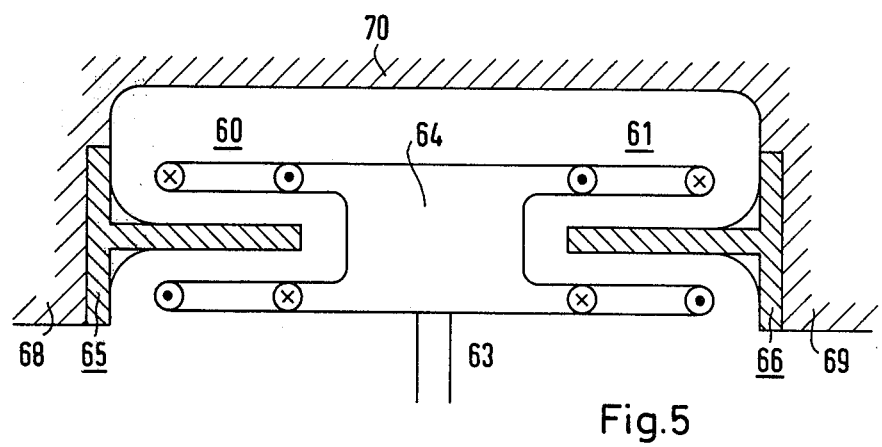

ELECTRO DYNAMIC SUSPENSION AND GUIDANCE SYSTEM FOR A MOVING VEHICLE

BACKGROUND OF THE INVENTION

This invention relates to the contactless guidance and suspension of moving vehicles in general and more particularly to an improved electro dynamic system for obtaining suspension and guidance in a vehicle such as a suspension railroad vehicle.

Known systems have been developed for the contactless suspension and guidance of vehicles travelling with high velocity reaching above 300 km/hr. Typically to obtain such suspension and guidance, superconducting magnet loops, preferably installed in the vehicle, are used. The vehicle magnet loops, often referred to as primary conductor loops cooperates with secondary conductor loops or secondary conductor means on the roadbed to provide the necessary suspension and guidance. In electro dynamic systems the secondary conductor means on the vehicle will preferably be rail like bodies of nonmagnetic materials which are sometimes also referred to as rail loops and in which eddy currents will be generated causing a magnetic repulsion force in conjunction with the primary conductor loops to provide the necessary lift or guidance forces for the vehicle. Other systems in which the electromagnetic principle is used and in which the secondary conductors are of a magnetic material utilizing magnetic attraction are also known but have characteristics less desirable than that of the electro dynamic system.

In electromagnetic suspension and guidance systems, two basic configurations have been developed. In what is referred to as a normal flux system and which is disclosed in U.S. Pat. No. 3,589,300, a current carrying primary conductor loop, generally mounted to the bottom portion of the vehicle, moves over an arrangement of metallic secondary conductor loops or rails of nonmagnetic materials. The magnetic field from the primary conductor loop induces eddy currents in the secondary conductor means or rails which eddy currents in turn generate a magnetic field having a direction opposite to the excitation field. As a result the vehicle is repelled from the loops or rails and a lift force produced which is proportional to the product of the rail current and the field component in the direction of the rail body. The eddy current losses and the braking forces generated thereby, on the other hand, are proportional to the square of the field component which runs perpendicular to the dimension of the rail body. In the normal flux system this flux component is relatively large and thus large eddy currents and correspondingly large braking forces are generated along with the required suspension or lifting force.

In what is referred to as a zero flux system and which is described in the publication "Cryogenics," pages 192–204 (1974), it is possible to produce the required lifting force without such large braking forces. In such a system two oppositely polarized magnetic fields of equal strength and facing each other are generated by primary conductor loops attached to the vehicle. The secondary conductor loop is disposed between the two primary conductor loops generating the two magnetic fields. In the plane of symmetry a zone is developed in which the induction in the direction of the thickness of the rail is zero, but the induction over the width of the rail and perpendicular to the direction of motion of the vehicle is twice as large as that obtained with a single coil. When the secondary conductor rail moves away from this region, which is referred to as the zero flux region, the induction in the direction of the thickness of the rail and thus the flux in this region increases while the induction in the direction of the rail perpendicular to the direction of motion in the vehicle remains approximately constant for small excursions. Thus, with relatively small rail currents it is possible to generate the same suspension force as with a normal flux system. The ratio of braking forces to lifting forces is considerably smaller than in a normal flux system. Although the zero flux system keeps braking forces small and results in a good stabilization of the system upward and downward with horizontal support of the vehicle primary conductor loops and the secondary conductor rails, the system always requires two sets of magnet coils to generate the two magnetic fields and these two coils result in large repulsion force on each other. As a result a sufficiently stable mechanical structure is required on the vehicle. This in turn increases the vehicle cost. Furthermore, the rail must be situated between the two coils. This can cause problems in properly supporting the rails.

The normal flux system, on the other hand, requires only a single magnet loop in the vehicle and permits a simple rail design. It has been recognized that a continuous plate which can be supported directly on the road bed will be sufficient for the secondary rail. However, it suffers the above noted disadvantage of large braking forces which then must be made up by the drive system of the vehicle. In German Offenlegungsschrift No. 2,139,506 a suspension and guidance system utilizing electrodynamic principles is disclosed. In the system disclosed therein two superconducting magnet loops fastened to the vehicle and arranged parallel to each other and disposed vertically are used. Between the two loops is a vertical stabilizing loop or secondary conductor rail attached to the road bed and used for generating horizontal lateral guidance forces for the vehicle. Between the two magnet loops is also placed a horizontal secondary conductor rail for generating a suspension force to counteract the force of gravity acting on the vehicle. This additional secondary conductor rail is arranged so as to form a cross with the stabilizing or lateral guidance rail. The system is a combination of two zero flux systems arranged orthogonal to each other and which mutually penetrate each other. To obtain a sufficiently stable attachment of the corresponding combination of the lateral guidance and suspension rails, whose cross sections form a cross perpendicular to the direction of motions of the vehicle, requires particularly strong support members. Also the two rails must be made relatively thick so that they will not be deformed during operation. Thick rails of this nature, however, lead to additional braking losses in the system.

In view of the above noted difficulty the need for an improved suspension and guidance system which lends itself to a simple and stable construction of the supports for stabilizing loops and which has low braking losses becomes evident.

SUMMARY OF THE INVENTION

The present invention solves this problem through the use of two vertical primary conductor loops in the vehicle which cooperate with a guidance or stabilizing secondary conductor loop situated between them and supported on the road bed to for a zero flux system for lateral guidance and the employment of a secondary conductor loop for generating lifting forces which is disposed horizontally below the stabilizing secondary conductor to form with the two primary conductor loops a normal flux system for suspension.

This arrangement has as a particular advantage that, because of the mutual spatial relationship of the primary conductor loops, separate superconducting magnet loops for the normal flux system is not required. Furthermore, a stable arrangement of the rail body including a secondary conductor for suspension and a secondary conductor for stabilization or guidance can be constructed since the reaction force opposite to the generated lifting force is in the direction of the roadbed on which the track body lies and is fastened. As a result a bending movement acting on the secondary conductor loop can be kept low. In addition, this secondary conductor can be kept relatively thin since it rests directly on the road bed.

In this type of system another solution of the problem is in the use of two horizontally spaced primary conductor loops with a secondary conductor for lifting disposed therebetween to form a zero flux system for suspension and a secondary conductor loop perpendicular thereto forming a normal flux system for lateral guidance. This second embodiment has relatively small braking losses since the zero flux system is used for suspension, the suspension system generally having higher braking losses than the lateral guidance system due to the additional weight of the vehicle which must be supported.

A further advantageous feature of the system of the present invention is in the construction of the two secondary conductor loops in a common T-shaped body. The T-shaped body can, in addition be provided with stiffening member over at least a portion therefor. As such it has great stiffness and can easily be produced e.g., as a casting.

BRIEF DESCRIPTION OF THE DRAWINGS

FIG. 1 is a view partially in cross section illustrating a first embodiment of the present invention.

FIG. 2 illustrates a further arrangement for the secondary conductor rails of the embodiment of FIG. 1.

FIG. 3 is a view similar to FIG. 1 illustrating another embodiment of the present invention.

FIGS. 4 and 5 respectively illustrate arrangements of the system of the present invention installed in vehicles.

DETAILED DESCRIPTION OF THE PREFERRED EMBODIMENT

FIG. 1 illustrates a first embodiment of the present invention. Along a roadbed two secondary conductors or rail loops 2 and 10 are arranged perpendicular to each other. The seconday conductor loops can be conductor coils having a plurality of turns or may be elongated plates and will consist of metal of a nonmagnetic type such as aluminum or a metal alloy with the same or similar properties. They are arranged in tandem in the direction of motion of the vehicle such as to form a T-shaped rail system. They are attached to the roadbed 6 which may be for example of poured concrete, the rails embedded therein. The rail 2 which forms the secondary conductor generating lifting forces is embedded in the upper portion 8 of the roadbed 6. The rail 4 which is arranged vertically and used for generating stabilizing or guidance forces is contained within stiffening member 10 which may be also a portion of the poured concrete roadbed. Alternatively the stiffening member 10 can be any nonmagnetic nonelectrically conducting material and can be secured to the concrete roadbed in any conventional fashion. Attached to a vehicle 16, of which only a portion is shown, are two primary conductor loops 12 and 14 having the polarity shown. As illustrated these two magnet loops are disposed parallel to the secondary conductor loop 4. With the illustrated polarity they generate magnetic fields in opposite directions as illustrated by the arrows on the Figure. The elements 12, 14 and 4 together form a zero flux system for the lateral guidance of the vehicle.

Because of the spatial relationship of the loops 12 and 14 with respect to the secondary loops 2 and 4, the system of the present invention results in not only a zero flux system for lateral guidance but also provides a normal flux system for suspension. The two primary conductor loops 12 and 14 cooperate with the secondary conductor loop 2 to form a normal flux system for generating the required lifting forces. The zero flux system for lateral guidance is designated A and the normal flux system for generating suspension forces designated B.

FIG. 2 illustrates a slightly different rail arrangement. Here the horizontal and vertical rail 22 and 24 respectively are combined into a single T-shaped structure. i.e., they are electrically connected with each other. This structure can be formed of two separate plates or rails 22 and 24 which are welded, sodered or bolted together. The system so formed is enclosed within a stiffening member 30 similar to the stiffening member 10 described above in connection with FIG. 1. This arrangement can also be produced as a single T-shaped member as a casting or the like.

A further embodiment of the invention is illustrated on FIG. 3. In essence the system of FIG. 1 has been rotated 90° so that now the horizontal secondary rail 40 cooperates with primary conductor loops 32 and 34 mounted on a vehicle 36 to form a zero flux system for suspension of the vehicle. Primary conductor loops 32 and 34 cooperate with the vertical secondary conductor rail 38 to form a normal flux system for lateral guidance. In this Figure the zero flux system for suspension is desinated C and the normal flux system for lateral guidance D. The two secondary conductor rails 40 and 38 may be formed as a single unit or may be formed of two separate rails welded, bolted or coupled together in some other manner. They are supported on the roadbed 42. For stiffening purposes a stiffening enclosure 44 made of a nonmettalic material which is fastened laterally to the track body 42 can be provided.

FIG. 4 illustrates the manner in which a vehicle 53 is supported above a roadbed 58 using an arrangement such as that of FIG. 1. Two arrangements equivalent to that of FIG. 1 but having a rail such as in FIG. 2 are provided. That is to say two sets of primary conductor loops 50 and 51 cooperate with two sets of secondary conductor rails 55 and 56 to generate the required suspension and lateral guidance forces.

FIG. 5 illustrates a further embodiment of the invention operating essentially as described in connection with FIG. 3. In this embodiment the means generating suspension and guidance forces are located on a support 64 above the vehicle with the vehicle attached to the support by means 63. The support 64 has pairs of primary conductor loops 60 and 61 on each side which cooperate with secondary conductor loops 65 and 66 in the manner described above in connection with FIG. 3.

In this arrangement the two rail systems 65 and 66 face each other and are fastened to track bodies 68 and 69 arranged parallel to each other and connected to each other by connecting member 70 forming the support arrangement for the suspended vehicle.

As is clear from FIG. 5, the arrangement of the present invention can be used to particular advantage to provide a safe support for a vehicle suspended from above. However, it is equally evident that the system also works well where the rail is mounted to the roadbed support.

Preferably in such vehicles a plurality of sets of primary conductor loops will be installed in the vehicle one behind the other in the direction of travel. In addition the vehicles will also be equipped with wheels in the chasis (not shown on the Figures) for use when the vehicle is stopped and at low vehicle velocities. The use of such wheels, which in many cases are retractable, for starting, stopping and standing is well known.

A particular useful drive in vehicles of this nature is a linear motor having an active portion coupled to the vehicle and a reaction rail or the like mounted on the tracks. Furthermore because of the large currents required to obtain sufficient magnetic fields, superconducting magnet coils are preferred in the primary conductor loops. These superconducting magnet coils will be kept at cryogenic temperatures in a well known manner using suital coolants such as helium. Again, since this is conventional, the cooling systems associated with the superconducting magnet coils are not illustrated.

Furthermore for damping oscillations of the vehicle in both the horizontal and vertical direction damping loops attached to the track and which interact with the magnetic fields of the primary conductor loops in such a manner that the vehicles are stabilized in an equilibrium position may be installed. In addition to using rails such as that disclosed herein for suspension and guidance it is also possible to use a plurality of secondary conductor loops arranged in tandem in the travel direction. Moreover they may be laminated in a well known manner i.e., they may consist of individual plates stacked in the manner of a sandwich type system. With such a construction only the components of the eddy current in the plane parallel to the plane of currents in the primary conductor loops for generating the lift force or the lateral stabilizing force respectively are effective while the other components which generate only braking forces and thereby losses are substantially reduced and in some cases are almost cancelled.

Since the guidance forces required for lateral stabilization are generally substantially smaller than the lift forces required for suspension, rails of smaller dimensions may be provided as the secondary conductor loops for lateral guidance. By doing so the braking loss of the system will be reduced. These and other modifications may be made without departing from the spirit of the invention which is intended to be limited solely by the appended claims.

What is claimed is:

1. A system for the contactless suspension and guidance of a vehicle which moves along a track, the system including a plurality of superconducting primary conductor loops connected to the vehicle and arranged parallel to each other which cooperate with secondary conductor means located on the roadbed to generate suspension and guidance forces using the electrodynamic principle wherein the improvement comprises at least one combined arrangement for generating both suspension and guidance forces comprising:
    a. primary conductor magnet loops arranged in a parallel spaced relationship on the vehicle in pairs the spacing of the magnet loops in each pair being such that they together form one single magnetic field, and the currents in the two magnet loops of a pair flowing in opposite directions;
    b. a single first secondary conductor means mounted to the roadbed disposed parallel to and between said primary conductor loops in said single magnetic field; and
    c. a single second secondary conductor means perpendicular to said first secondary conductor means at a point opposite the ends of said primary conductor loops whereby said primary conductor loops will cooperate with said first secondary conductor means to form a zero flux system acting in one direction and said primary conductor loops will cooperate with said second secondary conductor means to form a normal flux system acting in a direction perpendicular thereto.

2. A system according to claim 1 wherein said primary conductor loops are arranged vertically as is said first secondary conductor means and where said second secondary conductor means is arranged horizontally below said first secondary conductor means.

3. A system according to claim 2 wherein said first and second secondary conductor means comprise first and second rails connected together to form a body having a T-shaped profile.

4. The system according to claim 3 and further including stiffening means for stiffening said first and second secondary conductor means.

5. A system according to claim 4 wherein said stiffening means comprise a nonmagnetic material enclosing said secondary conductor means.

6. The system according to claim 1 wherein said primary conductor loops are arranged horizontally along with said first secondary conductor loop disposed therebetween and wherein said second secondary conductor means is arranged perpendicular thereto.

7. A system according to claim 6 wherein said first and second secondary conductor means comprise first and second rails connected together to form a body having a T-shaped profile.

8. The system according to claim 7 and further including stiffening means for stiffening said first and second secondary conductor means.

9. A system according to claim 8 wherein said stiffening means comprise a nonmagnetic material enclosing said secondary conductor means.

* * * * *